United States Patent [19]

Brunet

[11] 4,346,696

[45] Aug. 31, 1982

[54] SOLAR ENERGY COLLECTOR

[75] Inventor: Robert Brunet, Eysines, France

[73] Assignee: Brunet France S.A., Eysines, France

[21] Appl. No.: 21,234

[22] Filed: Mar. 16, 1979

[30] Foreign Application Priority Data

Sep. 27, 1978 [FR] France .................................. 78 28310

[51] Int. Cl.³ .............................................. F24J 3/02
[52] U.S. Cl. .................... 126/450; 126/449; 126/444; 126/422; 126/425; 237/1 R
[58] Field of Search ............... 126/450, 425, 444, 422, 126/449, 446, 432, 429, 430, 431, 442; 52/82; 237/1 R

[56] References Cited

U.S. PATENT DOCUMENTS

| | | | |
|---|---|---|---|
| 2,260,638 | 10/1941 | Pfost | 165/149 X |
| 3,369,539 | 2/1968 | Thomason | 126/449 X |
| 3,949,732 | 4/1976 | Reines . | |
| 4,003,367 | 1/1977 | Wikholm | 126/434 |
| 4,033,325 | 7/1977 | Walker | 126/434 |
| 4,072,142 | 2/1978 | Lof . | |
| 4,078,548 | 3/1978 | Kapany | 126/449 X |
| 4,120,283 | 10/1978 | Eder | 126/449 X |
| 4,132,222 | 1/1979 | Roark | 126/450 X |
| 4,133,150 | 1/1979 | Yacoboni | 126/450 X |
| 4,136,670 | 1/1979 | Davis | 126/450 X |
| 4,141,338 | 2/1979 | Lof | 126/449 |
| 4,149,525 | 4/1979 | Prado | 126/450 |
| 4,184,480 | 1/1980 | Kenny | 126/450 |
| 4,185,616 | 1/1980 | Johnson | 126/444 X |
| 4,236,507 | 12/1980 | Vincent | 126/450 |

FOREIGN PATENT DOCUMENTS 2178311 9/1973 France .

OTHER PUBLICATIONS

Article entitled "L'energie solaire a-t-elle un avenir industriel?" by Marcel Perrot et al., (*Arts & Metiers*, (1963), 07/08), 7/8, 23/30).

*Primary Examiner*—George P. Hall
*Attorney, Agent, or Firm*—Sandler & Greenblum

[57] ABSTRACT

A solar energy collector comprising a plurality of three-dimensional elements having substantially the same general configuration. Each of the elements has a substantially circular base and the elements are nested within one another so as to form the energy collector.

21 Claims, 10 Drawing Figures

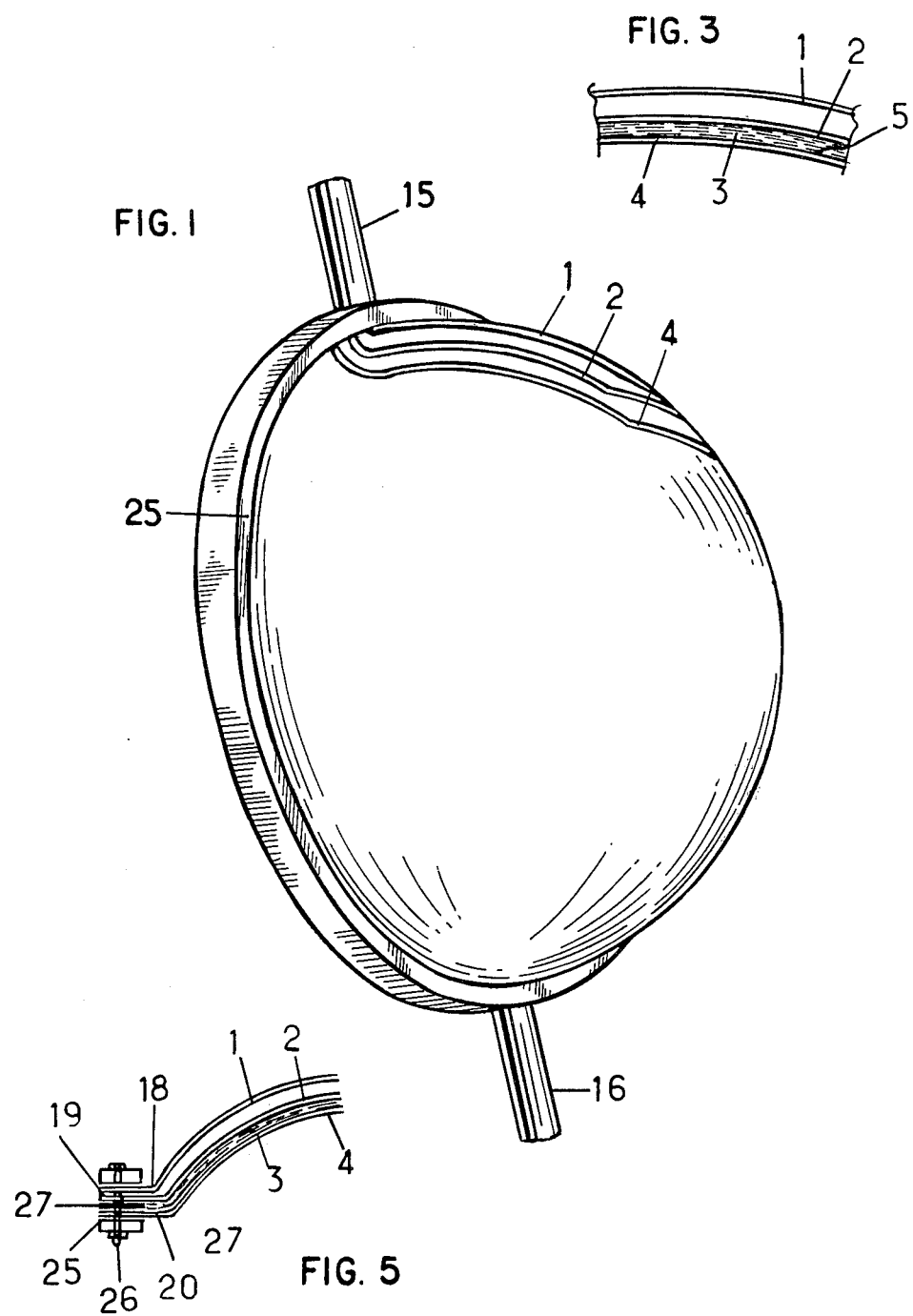

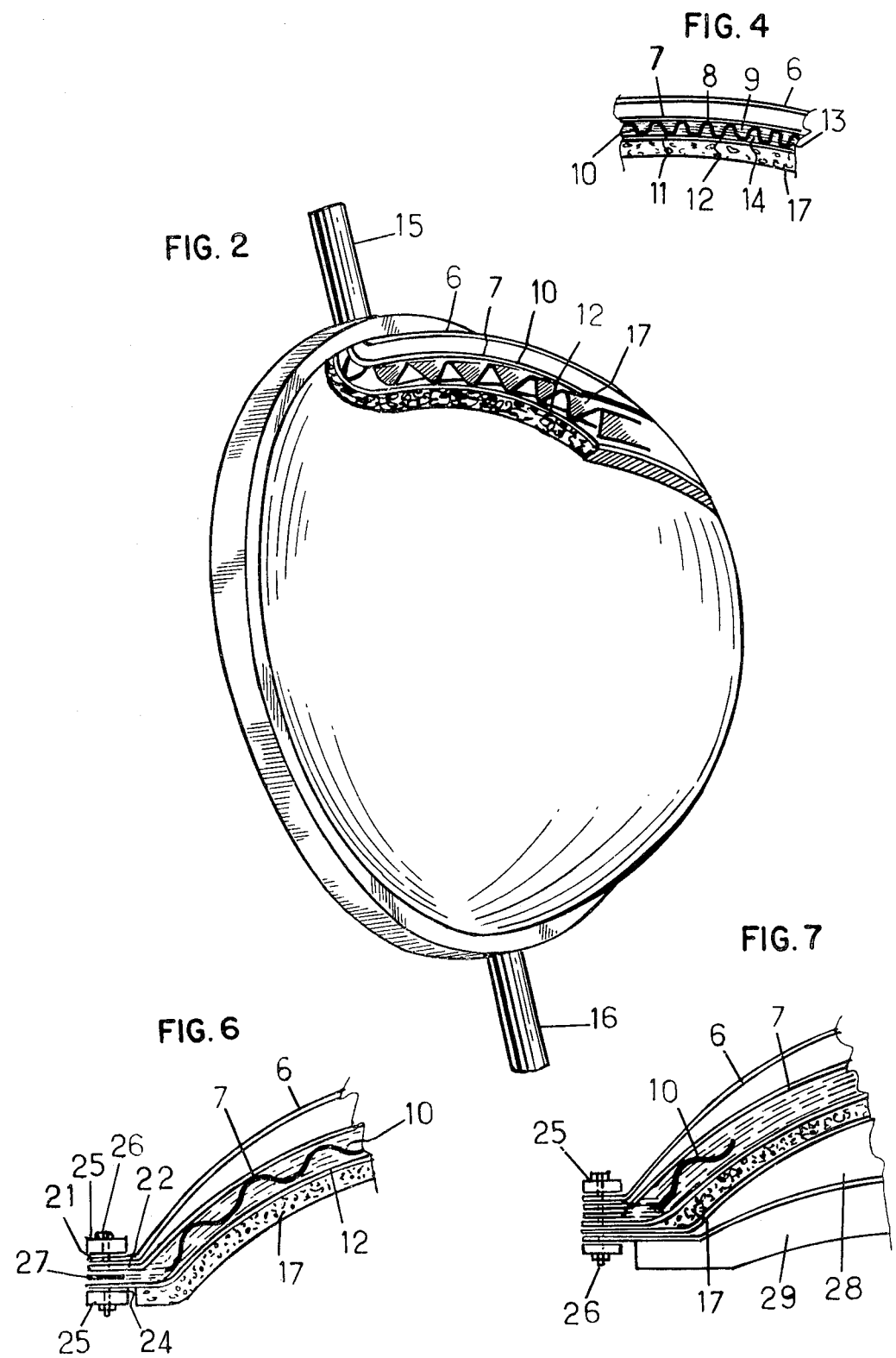

SOLAR ENERGY COLLECTOR

BACKGROUND OF THE INVENTION

1. Field of the Invention

The present invention relates to a solar energy collector.

2. Description of the Prior Art

Various types of solar energy collectors are known. Principally, known devices comprise a case support whose larger side is open and is arranged so as to face the sun. Within the interior of the case a sheet metal aborber is arranged which is either planar or cellular in structure and which absorbs solar radiation received and transmits the heat produced as a result of the radiation through a heat transfer fluid circulating under the sheet metal in a reservoir or canal. The reservoir or canal comprises a layer of sheet metal arranged under the absorber sheet metal, in a sealed fashion, preferably along the entire circumference of the absorber. Thermal insulation is generally provided beneath the sheet metal so as to limit thermal losses from the collector. The open face of the case is either left alone or covered with one or several transparent planar panels. The panels which are planar, but which may also be rounded, serve to protect and insulate the absorber while creating a greenhouse effect which favors heat transfer to the heat transfer fluid. The collectors are arranged either in a fixed fashion, or in a rotatable fashion so as to maintain their orientation perpendicular to the sun in the course of the earth's rotation.

These known solar energy collectors suffer from various inconveniences. Principally, it should be noted that the cost of the prior devices is relatively high because of the materials which must be used, particularly the absorber sheet metal and the reservoir or canal which contains the thermal fluid. Furthermore, the assembly of the prior devices requires that a seal be provided over the entire periphery of the device as well as over the various intermediate connections to the device so that deformation resulting from the high temperatures of the thermal transfer fluid do not adversely affect the device.

Yet another inconvenience of the prior art collectors is that if these collectors are not provided with a device for changing their orientation, a substantial portion of the rays will be reflected by the transparent closure panel and will, as a result, be lost. Naturally, this diminishes the yield of the collector. In those cases where the prior art collectors are provided with a transparent closure panel having a rounded surface, thus permitting it to capture solar radiation both very early or very late in the day, the radiation received cannot be collected and used because the space between the absorber and the rounded section of the closure panel is too great.

SUMMARY OF THE INVENTION

It is, therefore, an object of the invention to provide a solar collector which is both inexpensive to manufacture and yet highly effective.

It is a further object of the invention to provide a solar collector which may be simply sealed while nevertheless resulting in a high degree of absorption of solar radiation.

These as well as other objects are fulfilled by means of the solar energy collector of the invention which comprises a plurality of three-dimensional elements having substantially the same general configuration. Each of the element has a substantially circular base and the elements are nested within one another so as to form the energy collector.

In a preferred embodiment of the invention the elements have the general configuration of a dome.

In one embodiment of the invention, the collector is provided with at least three domes: an outer dome, an inner dome, and an intermediate dome. The outer dome is transparent and is arranged so as to yield a greenhouse effect within the collector.

The collector may additionally be provided with an intermediate dome section under which the heat transfer fluid to be used flows. The intermediate dome may be in the form of a dome having a plain cross-section, i.e., having smoothly arcuate inner and outer surfaces. Alternatively, the dome may be provided with a cellular or corrugated cross-section, or stamped into an arcuate but irregular configuration.

Thermal insulation may be arranged beneath the inner dome, and the collector may additionally be provided with a reservoir arranged between the base of the collector and the inner dome so as to provide storage space for the fluid used as the heat transfer medium.

In another embodiment of the invention, the collector additionally comprises a subdome in addition to the previously recited three domes and the intermediate dome is arranged between this subdome and the inner dome.

As yet another feature of the invention, the outer dome, subdome and inner dome are each provided with collars at their bases and a belt or strap is provided in conjunction with these collars for purposes of relieving stresses due to expansion and other pressures which occur as a result of exposing the collector to elevated temperatures resulting from exposure to sunlight.

BRIEF DESCRIPTION OF THE DRAWINGS

With respect to the annexed drawings, illustrated by way of example:

FIG. 1 illustrates a perspective view of the inventive solar collector comprising three elements having the shape of identical three-dimentional domes nested within one another;

FIG. 2 is an alternative embodiment comprising five elements having a dome shape;

FIG. 3 is a cross-sectional view along the vertical axis of the collector shown in FIG. 1;

FIG. 4 is a cross-sectional view along the vertical axis of the collector shown in FIG. 2;

FIG. 5 is a cross-sectional view of the base of the collector shown in FIG. 1 illustrating the use of a pair of belts;

FIG. 6 is a cross-sectional view of the base of the collector illustrated in FIG. 2 further including a pair of belts;

FIG. 7 illustrates an alternative embodiment of the invention having a reservoir incorporated therein;

DESCRIPTION OF PREFERRED EMBODIMENTS

Figure 8:
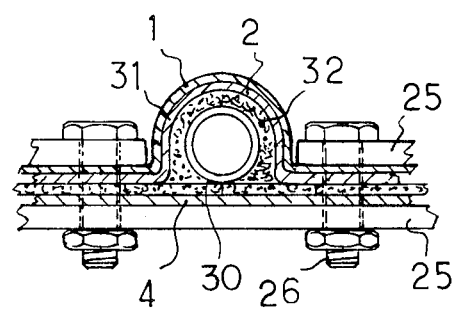
FIG. 8 illustrates the inlet-outlet provided for the thermal fluid.

The solar energy collector according to the invention comprises at least three elements nested within each other. Each of the elements has a substantially identical shape and is a three-dimensional dome having a circular base. Provided are: a transparent outer dome which serves to provide a greenhouse type effect, an intermediate dome, and an inner dome. The intermediate dome which is offset from the outer dome may be either planar, cellular, corrugated or pressed into any other form. This intermediate dome acts as the absorber or collector, and the heat transfer fluid used to transfer thermal energy from the collector circulates under the absorber or collector, between the collector and the inner dome. The third element of the solar energy collector is the inner dome whose outer face, i.e., the face of the dome directed towards the outer dome, is in contact with the thermal fluid and is constructed so as to reflect radiation. Each of the elements of the collector is connected at its periphery by means of a belt or pair of belts which relieves the effects of expansion and of pressure to which the domes are subjected in the course of their exposure to full sunlight.

Turning to the drawings, FIGS. 1 and 3 illustrates two embodiments of the invention in which the solar collector has at least three elements nested within one another, each of these elements having the shape of a three-dimensional dome with a circular base and a collar. Outer dome 1 is transparent and is normally oriented so as to face the sun. This dome further acts as a protection barrier or wall for the solar energy collector. Outer dome 1 may be made of reinforced plastic material, thermoset plastic, glass or glass products, or the like. Outer dome 1 is spaced from intermediate dome 2 which may be either planar, corrugated, or celled in cross-section. Dome 2 may be made of reinforced plastic material, thermoset plastic material, ferrous or non-ferrous metal or the like in sheets or arcuate sheets which may be nested. Intermediate dome 2 acts as an absorber or collector for the ultra-violet rays emitted by the sun which it serves to transform and transmit in the form of infra-red radiation to the heat transfer fluid 3, circulating under the intermediate dome 2. The thermal transfer fluid circulates between intermediate dome 2 and outer reflective face 5 of inner dome 4. Inner dome 4 may be made of reinforced plastic material, ferrous or non-ferrous metal, concrete, cement or the like. Besides acting to protect the solar energy collector, outer dome 1 also functions to create a greenhouse effect thus increasing the heat transferred to the absorber and/or collector. This outer dome additionally reflects a portion of the infrared and ultraviolet rays which it transmits to the absorber and/or collector.

As shown in FIGS. 4 and 6, a layer of insulation 17 may be applied against the inner surface of the inner dome so as to avoid and minimize heat losses.

The heat transfer fluid is circulated throughout the solar collector and passes through an inlet 15 before transversing the solar collector and escaping through outlet 16. By connecting the inlet and outlet of the solar energy collector with a line comprising a suitable heat exchanger, the heat absorbed by the heat transfer fluid may be transferred to another medium by means of the heat exchanger. Thus the calories of energy absorbed by the heat transfer fluid may be transferred to the fluid or substance where they are ultimately needed.

As shown in FIGS. 2 and 4, the collector may comprise four elements nested within one another, each of the elements comprising substantially identical domes, each having a circular base. The outer dome 6 is transparent and is oriented to face the sun. This outer dome constitutes a protection wall and is spaced from the wall of first subdome 7 which is itself transparent. Domes 6 and 7 may be made of reinforced plastic material, thermoset plastic, glass or glass products and the like. The first subdome 7 is supported on its inner surface by the upper extremity 8 of the corrugations or cells 9 of the intermediate dome 10. As shown, the intermediate dome has a generally sinusoidal configuration. The lower portions 11 of the corrugations or cells 9 are supported by inner dome 12 whose outer surface 13 is reflective. As was the case with dome 4, dome 12 may be made of reinforced plastic material, ferrous or non-ferrous metal, concrete, cement, or the like. Intermediate dome 10 acts as an absorber or collector as was previously described with respect to the first embodiment, and acts to absorb ultra-violet rays produced by the sun and to transmit infrared rays which are reflected by the outer reflective surface 13 of the inner dome 12 as well as by a portion of domes 6 and 7 so that these rays are transfererred to the heat transfer fluid 14 circulating and streaming between the first subdome 7 and the inner dome 12 over the corrugations or cells 9. Dome 10 may be made of reinforced plastic material, thermoset plastic, ferrous or non-ferrous metals formed in flat or arcuate sheets which may be nested if desired. Dome 10 may further be in the form of a ferrous or non-ferrous metal screen or network of interwoven wires so as to provide a surface having interstices through which the thermal fluid is free to pass as it circulates. The fluid is fed into the collector by means of an inlet 15 and leaves through an outlet 16, although the inlets and outlets are reversible and the fluid may obviously flow in the opposite direction (FIG. 8). The solar energy collector may constitute part of an energy circuit in which heat transfer fluid leaves the collector and is brought into contact, by means of a heat exchanger, with another fluid or substance adapted to receive calories of heat from the heat transfer fluid. Once having given off its excess heat, the heat transfer fluid may then be returned to the inlet of the collector to be heated once again. As previously described, besides acting as a protector, outer dome 6 makes it possible to create a greenhouse type effect within the collector. A thermal insulator 17 may be applied under the dome 12. The thermal insulation may be provided with sufficient body so as to maintain itself in position or it may be maintained by means of a skeleton support structure not shown.

As shown in FIGS. 5 and 6, domes 1, 2, 4, and 6, 7, 12 each end in a small collar or rim 18, 19, 20, and 21, 22, 24 respectively. These collars make it possible to assemble and maintain the domes in their proper orientation by means of a circular belt or pair of belts 25 arranged above and below the superimposed collars. The belt 25, which may be made of metal, is resistant to the effects of expansion and of pressure to which the domes are subjected when placed in full sunlight and serves to overcome the expansion absorbed by the domes themselves which may become deformed without causing deterioration of the solar energy collector or its operation. The belt 25 is secured to the solar energy collector by means of nuts and bolts 26 although other means of securing the belt may obviously be used. However, so as to create a perfect seal between the domes 2 and 4, and 7 and 12, a seal 27 may be arranged between each of the collars (although only one such seal is shown) so as to prevent the heat transfer fluid from leaking out of the solar energy collector structure.

With reference to FIG. 6, intermediate dome 10 is not provided with a collar. Instead, this dome is arranged and maintained between domes 7 and 12 so as to allow for the free expansion of this dome without such expansion resulting in possible leakage of the thermal fluid around the circumference of the belt 25 at the level of the joints formed with securing means 26. Such an arrangement, due to the free unsecured end of dome 10, further leads to the division of the thermal fluid into two streams which flow over both sides of the intermediate dome 10 between domes 7 and 12. The intermediate dome is thus arranged to permit the thermal fluid to flow freely from the inlet to the outlet of the collector.

According to the embodiment shown in FIG. 7, the space between the insulation 17 and the base of the collector may be adapted to include a reservoir 28 containing the liquid, fluid, or other substance to be heated by the heat transfer fluid. This is done by passing pipes and lines (not shown) comprising a heat exchanger into contact with the reservoir. The heat transfer fluid flows through the heat exchanger and heats the liquid within the reservoir 28. Quite obviously, reservoir 28 as well as all exterior lines and pipes may be insulated so as to avoid and minimize heat losses. The reservoir 28 may be provided with stiffeners 29 so as to withstand possible deformations resulting from thermal shocks or strong localized pressure differences. The reservoir 28 may comprise two domelike structures having a space between them wherein the material to be heated is stored. Each of the domelike structures may themselves end in a collar located at the base of the energy collector.

The reservoir is positioned between the inner dome and the collector base; the inner dome and collector base together define a volume which does not extend outwardly beyond the base of the inner dome, as shown in FIGS. 1-7. The fluid reservoir is located within this volume, between the collector base and the inner dome, irrespective of the shape of the collector base.

As seen from FIG. 8, the solar energy collector comprises a structure which may serve as inlet 15 as well as outlet 16 for the thermal fluid. The structure comprises a pipe or tube 30 which extends from the exterior of the solar collector to within the device such that the pipe is in fluid communication with the spaces between domes 2 and 4, or 7 and 12 depending upon the type of solar collector structure being used. The pipe or tube extends through an expanded portion 31 of collars 18 and 19 or 21 and 22. The expanded portion 31 has a shape which corresponds to that of the tube or pipe and itself acts as a collar. An effective fluid seal is assured by virtue of a packed joint 32. The sealing joint is compressed when the holding means for the belt such as nuts and bolts 26 are tightened. This tightening results in the tube or pipe becoming immobilized within the collar 31. The tube or pipe extends no further than the space between the domes.

Figure 9:
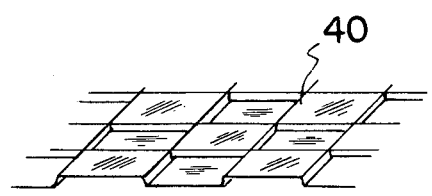
FIG. 9 shows one embodiment of the absorber-collector for use in FIGS. 1 and 2.

FIG. 9 illustrates a celled structure 40 for use as an intermediate dome suitable for use in conjunction with the solar collectors illustrated in either FIG. 1 or 2 as the intermediate dome 2 or 10.

Figure 10:
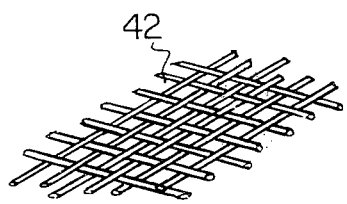
FIG. 10 illustrates one embodiment of an intermediate dome which may be used in the device of FIG. 2.

FIG. 10 illustrates an alternative material structure 42 for use as the intermediate dome 10 in the embodiment of FIG. 2. The material comprises a screen or weave of metallic, ferrous or non-ferrous, plastic or glass wires or threads.

The invention has been described with respect to specific means and materials. It is to be understood, however, that the invention is to be construed as limited only by the claims.

What is claimed is:

1. A solar energy collector comprising at least four domes: an outer transparent dome arranged so as to result in a greenhouse effect within said collector, a subdome, an inner dome, and an intermediate dome; each of said domes having a substantially circular base and being nested within one another so as to form said energy collector, each of said domes having a collar at its base, said collars overlapping when said domes are nested, said collector further comprising a belt arranged above and below said collars so as to absorb stresses to which each of said domes is subjected.

2. The solar energy collector as defined by claim 1 wherein said inner dome has an outer surface which is reflective to infrared radiation.

3. The solar energy collector as defined by claim 2 wherein said intermediate dome has a hemispherical cross-section and said intermediate dome is adapted to provide a passage for the flow of a fluid under said intermediate dome between said outer and inner domes, and said intermediate dome is adapted to act as a collector of infrared radiation and is adapted to transfer said radiation to said fluid.

4. The solar energy collector as defined by claim 3 wherein said intermediate dome is planar in cross-section.

5. The solar energy collector as defined by claim 3 wherein said intermediate dome is cellular in cross-section.

6. The solar energy collector as defined by claim 3 wherein said intermediate dome is corrugated in cross-section.

7. The solar energy collector as defined by claim 3 wherein said intermediate dome is stamped so as to result in an irregular but arcuate configuration.

8. The solar energy collector as defined by claim 1 wherein said subdome is inwardly spaced from said outer dome and outwardly spaced from said inner dome.

9. The solar energy collector as defined by claim 8 wherein said intermediate dome is adapted to collect infrared radiation and to transmit said radiation to fluid circulating between said intermediate dome and said inner dome.

10. The solar energy collector as defined in claim 9 wherein said intermediate dome is arcuate in cross-section.

11. The solar energy collector as defined by claim 9 wherein said intermediate dome is cellular in cross-section.

12. The solar energy collector as defined by claim 9 wherein said intermediate dome is corrugated in cross-section.

13. The solar energy collector as defined by claim 9, wherein said intermediate dome is stamped so as to result in an irregular but arcuate configuration.

14. The solar energy collector as defined by claim 1 further comprising a layer of thermal insulation beneath said inner layer.

15. The solar energy collector as defined by claim 14 further comprising a fluid reservoir for heat transfer fluid arranged between said thermal insulation and the base of said solar energy collector.

16. The solar energy collector as defined by claim 15 wherein said heat transfer fluid reservoir comprises two domelike structures with a space between them, each of said domelike structures ending in a collar arranged at the base of said energy collector.

17. A solar energy collector as defined by claim 1 wherein said intermediate dome is arcuate and has a generally sinusoidal configuration.

18. A solar energy collector comprising a base and four three-dimensional elements having substantially the same general configuration, each of said elements comprising a dome having a substantially circular base, said domes being nested within one another so as to form said energy collector, said domes comprising an outer transparent dome which is adapted to cause a greenhouse effect within said solar collector, a subdome, an intermediate dome which is adapted to collect infrared radiation and to transmit said radiation to fluid circulating in the space between said subdome and an inner dome, said inner dome being adapted to reflect infrared radiation, said inner dome and said collector base together defining a volume which does not extend outwardly beyond the base of said inner dome, said solar energy collector further comprising a heat transfer fluid reservoir which is arranged between said inner dome and the base of said solar energy collector and which is located within said volume.

19. The solar energy collector as defined by claim 18 wherein said heat transfer fluid reservoir comprises two domelike structures with a space between them, each of said two domelike structures ending in a collar located at the base of said energy collector.

20. The solar energy collector as defined by claim 18 further comprising a layer of thermal insulation positioned between said inner dome and said fluid reservoir.

21. A solar energy collector comprising a base and at least three three-dimensional elements having substantially the same general configuration, each of said elements comprising a dome having a substantially circular base, said domes being nested within one another so as to form said energy collector, said at least three domes comprising an outer, transparent dome which is adapted to cause a greenhouse effect within said solar collector, an intermediate dome adapted to collect infrared radiation and to transmit said radiation to fluid circulating between the intermediate dome and an inner dome, said inner dome being adapted to reflect infrared radiation, said inner dome and said collector base together defining a volume which does not extend outwardly beyond the base of said inner dome, said solar energy collector further comprising a heat transfer fluid reservoir which is arranged between said inner dome and the base of said solar energy collector and which is located within said volume.

* * * * *